US006240423B1

(12) United States Patent
Hirata (10) Patent No.: US 6,240,423 B1
(45) Date of Patent: May 29, 2001

(54) METHOD AND SYSTEM FOR IMAGE QUERYING USING REGION BASED AND BOUNDARY BASED IMAGE MATCHING

(75) Inventor: Kyoji Hirata, Sunnyvale, CA (US)

(73) Assignee: NEC USA Inc., Princeton, NJ (US)

( * ) Notice: Subject to any disclaimer, the term of this patent is extended or adjusted under 35 U.S.C. 154(b) by 0 days.

(21) Appl. No.: 09/064,061

(22) Filed: Apr. 22, 1998

(51) Int. Cl.[7] .................................................. G06F 17/00
(52) U.S. Cl. .............................. 707/104; 707/1; 382/305
(58) Field of Search .................................... 707/104, 1–6, 707/100–102; 709/217–219; 382/190–192, 305, 161–162, 165, 182

(56) References Cited

U.S. PATENT DOCUMENTS

| 5,647,058 | 7/1997 | Agrawal et al. | ......................... 707/1 |
| 5,852,823 | * 12/1998 | De Bonet | ................................ 707/6 |
| 5,893,095 | * 4/1999 | Jain et al. | ................................ 707/6 |

OTHER PUBLICATIONS

Microsoft Press Computer Dictionary, Second edition, 1994, p. 326, Dec. 1994.*
"Region–Based Image Querying," Carson et al., Proceedings of the IEEE 1997 Workshop on Content–Based Access of Imag and Video Libraries, pp. 42–49, Jun. 1997.*
"Geographical Image Classificationand Retrieval," Shiekholeslami et al., Proceedings of the 5th International Workshop on Advances in geographic Information, pp. 58–61, Nov. 1997.*
"12Cnet: Content–based Similarity Search in Geographically Distributed Repositories of Medical Images," Orphanoudakis et al., Computerized Mediacl Imaging and Graphics, vol. 20, No. 4, pp. 193–207, Jul. 1996.*
"A Flexible Image Retrival Using Explicit Visual Instruction," Kanahara et al., Proceedings of the 1995 Third Int'l Conference on Document Analysis and recognition, vol. 1, Aug. 1995, IEEE, pp. 175–178.*
"SaFe: A Genarl Framework for Integrated Spatial and Feature Image Search," IEEE First Workshop on Multimedia Processing, Jun. 1997, pp. 301–306.*
"Visually Searching the Web for Content," Smith et al., IEEE Multimedia, vol. 4, No. 3, pp. 12–20, Jul. 1997.*
Jeffrey R. Bach, et al., "The Virage Image Searching Engine: An open framework for image management" Proceedings of SPIE—The International Society for Optical Engineering: Storage and Retrieval for Still Image and Video Databases IV, pp. 76–87, Feb., 1996.
Myron Flickner, et al., "Query by Image and Video Content: The QBIC™ System" IEEE Computer, 28(9):23–31, Sep., 1995.
Kyoji Hirata, et al., "Content–oriented Integration in Hypermedia Systems" ACM Hypertext '96, pp. 11–26, Mar., 1996.
Kyoji Hirata, et al., "Media–based Navigation for Hypemedia Systems" ACM Hypertext'93, pp. 159–173, Nov., 1993.
Kyoji Hirata, et al., "Object–based Navigation: An Intuitive Navigation Style for Content–oriented Integration Environment" ACM Hypertext'97, pp. 75–86, Apr., 1997.

* cited by examiner

Primary Examiner—Hosain T. Alam
(74) Attorney, Agent, or Firm—Sughrue, Mion, Zinn, Macpeak & Seas, PLLC (57) ABSTRACT

A method and apparatus for querying a database of images, in which the results of the query are based upon a combination of region based image matching and boundary based image matching. Additionally similarity calculations are made between individual results of the query so that the results may be clustered based upon similarity.

44 Claims, 9 Drawing Sheets

Image 01  Image 02

Image 03  Image 04

*FIG. 5*

Image 01  Image 02

Image 03  Image 04

METHOD AND SYSTEM FOR IMAGE QUERYING USING REGION BASED AND BOUNDARY BASED IMAGE MATCHING

BACKGROUND OF THE INVENTION

1. Field of the Invention

The present invention relates generally to the field of querying a database of images and particularly to querying a database of images using a combination of region based image matching and boundary based image matching.

2. Description of the Related Art

Huge amounts of information are being circulated daily at an uninterrupted pace on the World-Wide Web (WWW). Additionally, in museums and photo stock agencies, millions of images are stored for on-line usage. With the explosive growth in the volume and distribution of information, more intelligent information processing and management has become critical. Various methods of accessing target data have been developed to address issues relating to image retrieval, image clustering, query interface and WWW information retrieval.

The Virage Image Retrieval Engine is a system for image retrieval based on visual features, such as color, shape and texture. See J. R. Bach, et al., "The Virage Image Search Engine: An Open Framework for Image Management," Proceedings of SPIE- The International Society for Optical Engineering: Storage and Retrieval for Still Image and Video Databases IV, pp. 76–87, February 1996. Virage creates feature vectors relating to color, composition, texture and structure. In a matching phase, where a query is matched against potential result candidates, the Virage search engine calculates the distance of a feature vector for each potential result candidate with respect to the query. The result candidates are then presented. The approach presented by Virage focuses on the calculation of the vector and each element of the vector. Such an approach is not intuitive for users. In the registration (image indexing) and matching phases, Virage does not identify objects contained in the image. Rather, the feature vectors are extracted based on the whole image or a block of the image. Thus, it is hard to introduce analysis at an object level, such as object-based navigation and object-based clustering.

QBIC, a system developed at IBM, is another system that supports image retrieval using visual examples. See M. Flickner, et al, "Query by Image and Video Content: The QBIC System," Intelligent Multimedia Information Retrieval edited by Mark T. Maybury, Chapter 1, Reprinted from IEEE Computer, 28(9): 23–31, September, 1995. The image matching in QBIC is based on features such as color, texture, and shape, similar to Virage.

The instant inventor has assisted in developing a Content Oriented Information Retrieval engine (the COIR engine) to index and retrieve a large amount of image and video data. See K. Hirata, et al., "Media-based Navigation for Hypermedia Systems," ACM Hypertext'93 pp. 159–173, November 1993; K. Hirata, et al., "Content-oriented Integration in Hypermedia Systems," ACM Hypertext'96 pp. 11–26, March 1996; and K. Hirata, et al., "Object-based Navigation: An Intuitive Navigation Style for Content-oriented Integration Environment", ACM Hypertext'97 pp. 75–86, April 1997. Each of these three Hirata articles, as well as each of the references discussed throughout is hereby incorporated by reference herein. One of the major characteristics of the COIR engine is that visual and semantic attributes are assigned to an object in an image or video scene. In a phase in which the images are registered, the COIR engine divides the input image into several regions, assuming them to be meaningful objects. The COIR engine extracts visual attribute values, including color, shape and texture-related values, from each region automatically. The semantic attributes are assigned to each region. Both visual and semantic attributes are stored hierarchically based on object structure, which improves the precision of image searching compared with existing feature-based image processing approaches.

The COIR engine provides flexible multimedia search capabilities based on metadata structure, the metadata being the resulting data from the registration phase extracting various features from the images. In the matching phase, where a query is applied to the available images, the COIR engine correlates objects contained in the query image with those in the target image, comparing attribute values at the object level. The COIR engine evaluates the position of the objects and overlapping areas in order to correlate the objects with each other. This matching process enables an intuitive search for users. Users can also integrate visual characteristics and semantics at the object level and can also focus on specific objects in the image or on a relationship between objects to get the images they are interested in. However, a one-to-one correlation between the visual features and semantic meanings does not always exist. In other words, while in many situations it is possible to perform object extraction based on visual characteristics, in other situations, it is very difficult to extract objects using visual characteristics. In the latter situations, the results of object extraction are not what a user might expect. Since object extraction is executed automatically based on the visual characteristics, the COIR engine cannot always extract the object from the image

SUMMARY OF THE INVENTION

To overcome these and other difficulties, the present invention is directed to a novel method and apparatus for content based image searching. A method and apparatus are described which provide a way to integrate region based image matching with boundary based image matching. Boundary based image matching requires precise evaluations of line correlation, and, therefore takes more time than region-based matching. To increase the speed of a search, the present invention provides the following steps for the search and matching process. First, image similarity is evaluated based upon region-based similarity criteria, i.e. region based image matching is performed. Second, a boundary based image matching technique is applied to the results of the region based image matching step. Finally, the results of the boundary based image matching step may be reordered based upon the similarities among the individual result candidates. This final step allows users of a search engine to visualize representative candidate images at a glance. In some instances it may be desirable to perform the first and second steps alone, without performing the third step. In other instances the third step may be performed in conjunction with many different matching mechanisms, including those of the first and second steps.

Figure 1:
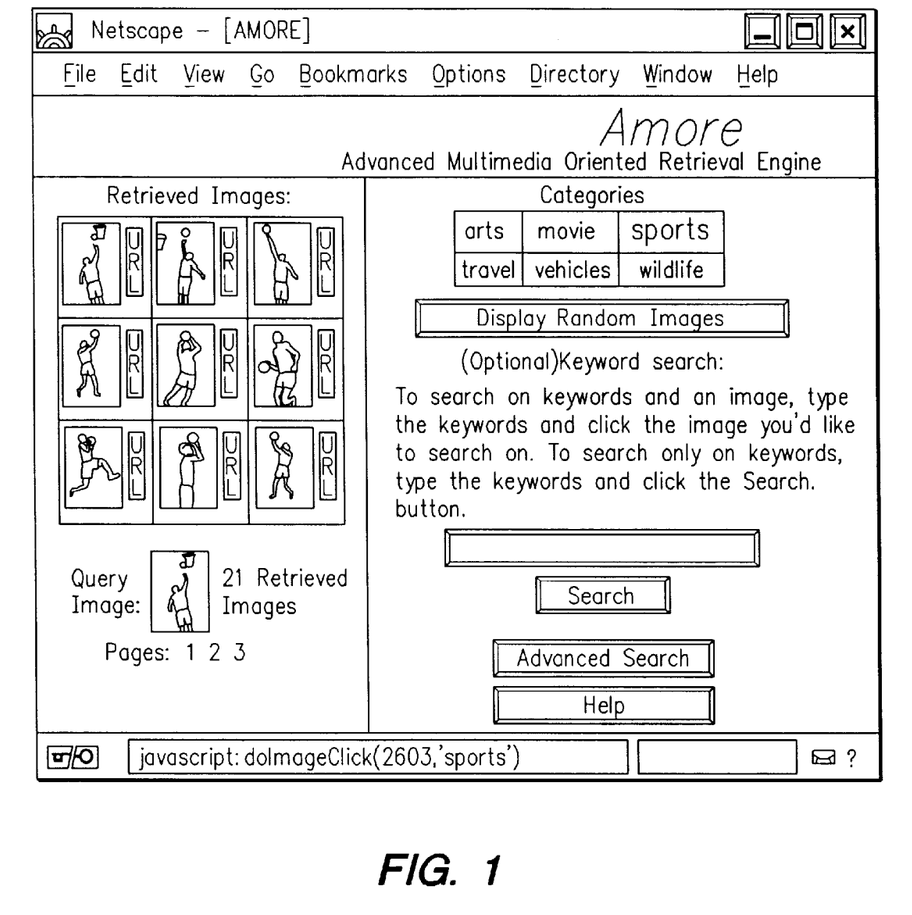
FIG. 1 shows the results of a search using the COIR engine.

Additionally, the object boundary based image matching capability of the present invention, including partial boundary line matching, helps solve problems with prior systems. By directly correlating boundary line segments, the COIR engine can improve retrieval accuracy. FIG. 1 shows an example of results of a search. By evaluating the direction of the line segment, as well as the other factors including color and composition, the COIR engine retrieves more appropriate candidates from the image archive.

Figure 2:
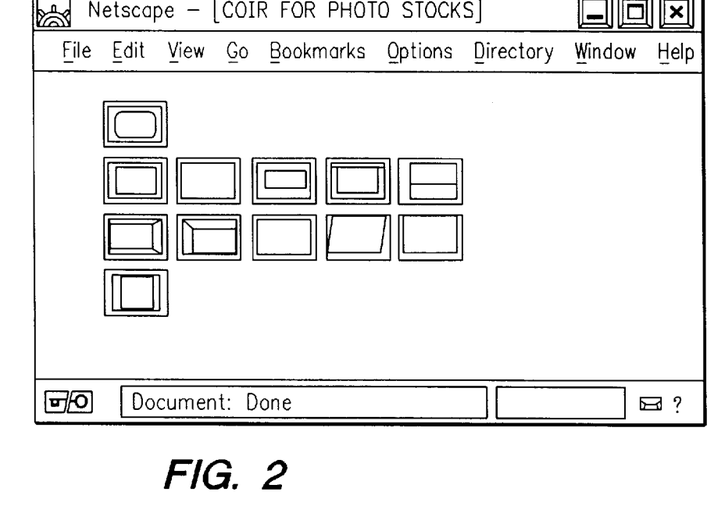
FIG. 2 shows the results of a search using the COIR engine where it is difficult to correctly extract objects in an image.

Furthermore, the COIR engine shows appropriate candidates even when object extraction does not succeed. FIG. 2 illustrates this situation. The image shown on the upper left side of FIG. 2 is a query image specified by the user. It is very hard to specify the object contained in the query image, but by evaluating the edges partially extracted from the image, the COIR engine provides similar images from the image database.

BRIEF DESCRIPTION OF THE DRAWINGS

The above objects and advantages of the present invention will become more apparent by describing in detail preferred embodiments thereof with reference to the attached drawings in which.

DETAILED DESCRIPTION OF THE INVENTION

A preferred embodiment of a method and apparatus for querying a database of images using an integration of region based image matching and boundary based image matching is described below in detail with reference to the accompanying drawings. It is to be noted that while the following discussion is presented in the context of the COIR engine, the present invention is not so limited. The present invention may be applied to a variety of search engines for the WWW, multimedia databases, etc.

Initially, some background information is provided regarding the registration and matching phases in the COIR engine. Further details can be found in Hirata et al, "Media-based Navigation for Hypermedia Systems," ACM Hypertext '93, pp. 159–173, November 1993.

To provide object-based navigational capabilities, the COIR engine stores attribute values using the objects as a unit. In the registration phase, where the images are registered, the COIR engine extracts objects from the images. The COIR engine accomplishes this by dividing the original image into several regions based on visual characteristics including color, edge, position, texture, etc. The COIR engine considers these regions as the objects and stores attributes for the objects. A detailed flow of this process is described in Hirata et al, "Media-based Navigation for Hypermedia Systems." The COIR engine extracts the visual attribute values from each region automatically.

Figure 3:
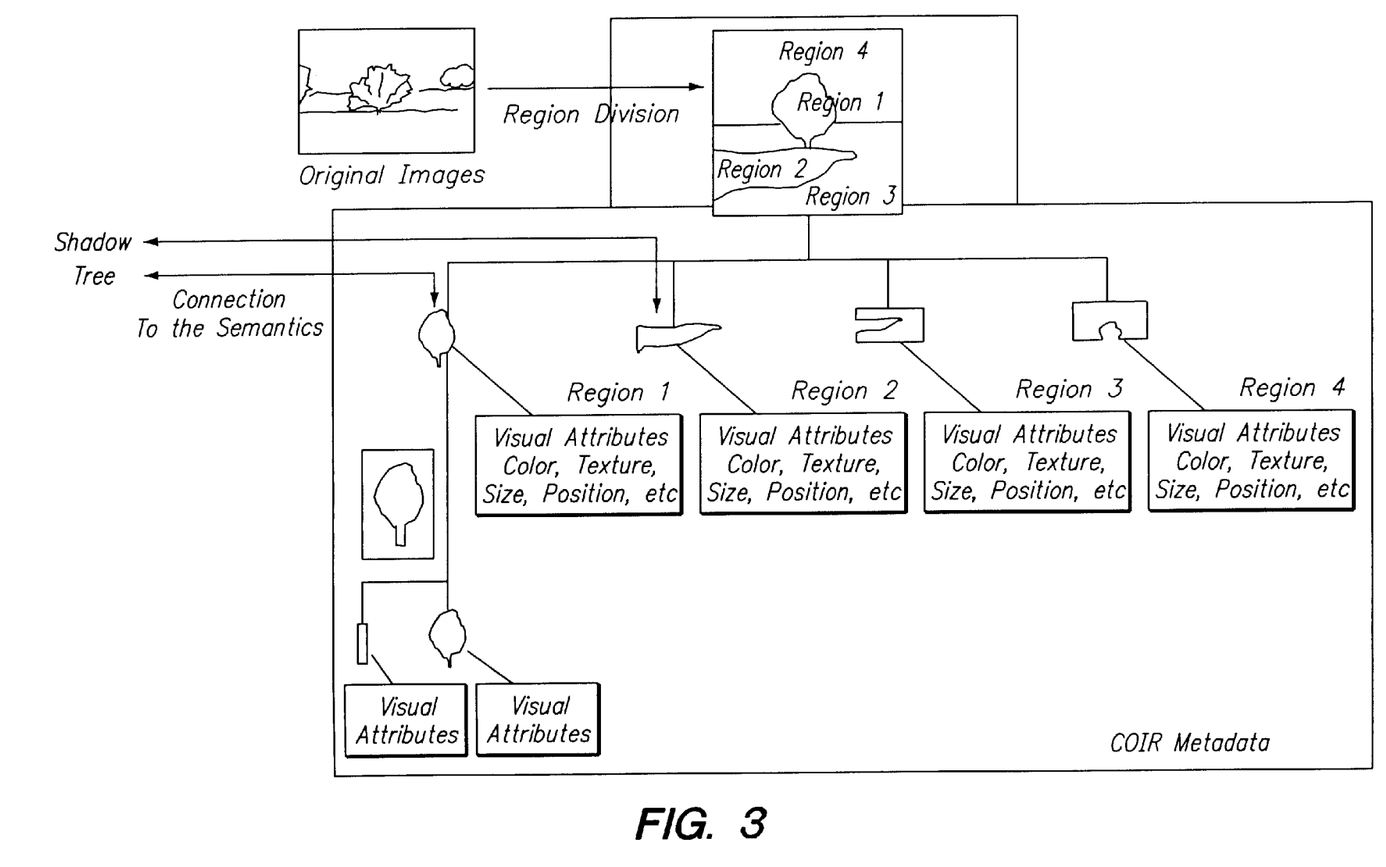
FIG. 3 shows the structure of metadata in the COIR engine.

Semantic features are then assigned interactively using authoring tools if required. Users can also specify a hierarchical structure using the authoring tools. FIG. 3 shows an example of an image divided into four regions. Each region has a set of visual attributes assigned to it. Additionally, region 1 is further divided to define a second level of objects. When users specify such a second level of structure, the COIR engine also extracts the visual attribute values from the second-level regions. Users can also assign semantic features to the second-level regions as shown in FIG. 3. Metadata in each level has similar granularity. Therefore, matching between different levels can be accomplished by using the same criteria.

In a region based matching phase, the COIR engine evaluates image similarity based on the object level entities. The matching process has to be flexible enough to address ambiguous queries and has to be executed at very high speed. Additionally, users sometimes require images which match the query partially (i.e. some, but not all, of the regions of the image match) or match the query with a shifted condition (i.e. regions are located at different positions in the images).

Figure 4:
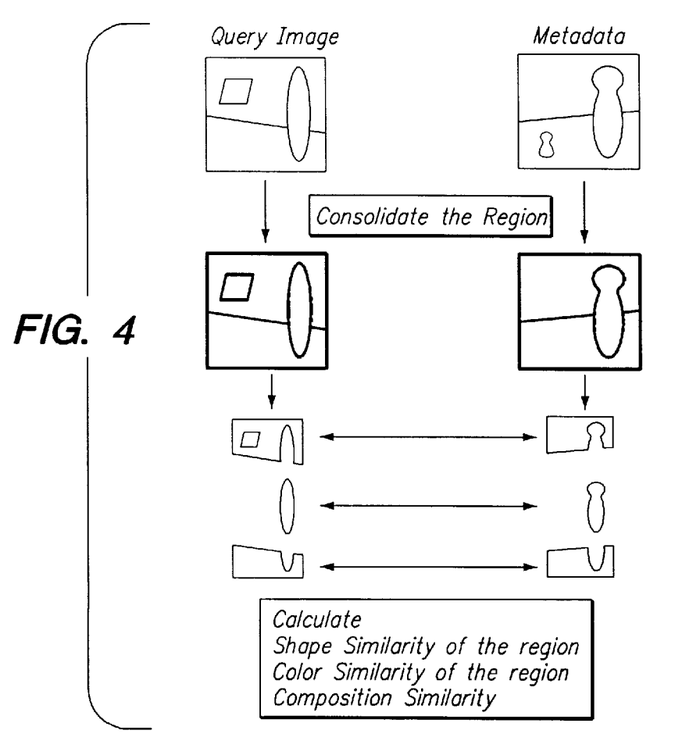
FIG. 4 shows the steps of an image matching process.

FIG. 4 illustrates the flow of the matching step. Initially, the COIR engine merges the regions of the query image and the metadata in the system until each region of the query image and the metadata are adjusted. The attribute values of the merged region are inherited in the new region. The COIR engine evaluates the correlation of the objects based on their position and the overlapping area. Then, it measures the similarity of the shape, color or position of each region. Since the objects are correlated to each other, the system does not have to consider the positional difference in calculating the shape and color similarities. By adjusting each region of the query and metadata in advance, the COIR engine can retrieve the target images even if the query is ambiguous about the location or the size of the objects.

The COIR engine evaluates the degree of correlation (location similarity) and the attribute values of objects, such as color, texture, etc., separately and then integrates them. The precise algorithm is described in Hirata et al, "Media-based Navigation for Hypermedia Systems." The COIR engine can calculate similarity very rapidly, since the attribute values are evaluated one time after the objects are correlated with each other. This algorithm can process the condition stating that some of the objects are missing or shifted. It works well when the COIR engine can extract objects contained in the image as users expect.

The present invention provides improved search capabilities. Again, while the following discussion is presented in the context of the COIR engine, the present invention is widely applicable to a variety of search engines and to a variety of databases of images, such as multimedia databases and the WWW.

Figure 5:
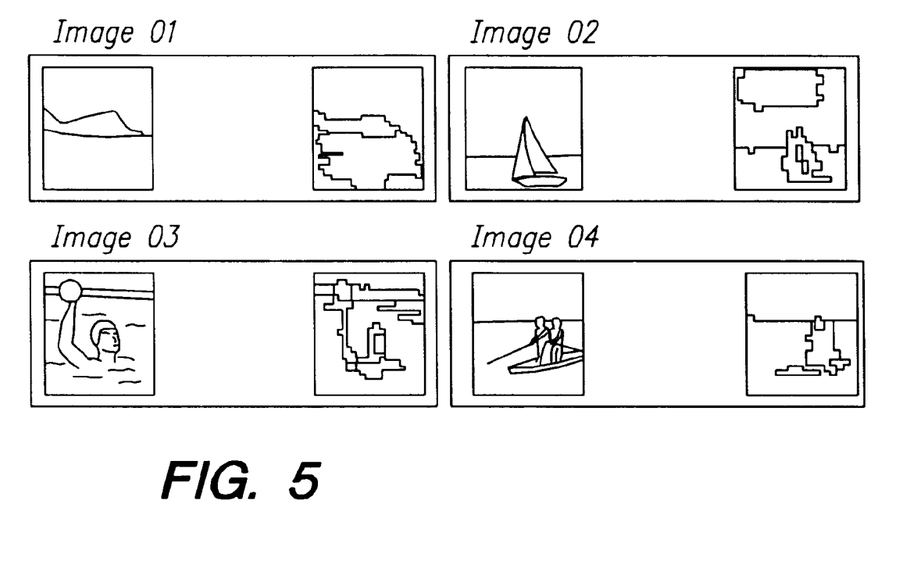
FIG. 5 shows an embodiment of an object extraction procedure in accordance with the present invention.

FIG. 5 shows one aspect of the object extraction procedure of the present invention. The images on the left are the original images, while the images on the right represent the extracted objects from the original images.

As can be seen from the set of images to the right, the COIR engine successfully extracts the airplane from image 01 and also extracts the yacht from image02. Additionally, the COIR engine extracts the clouds and sky from the image01 and extracts the clouds, sea and sky from the image02. However, the person in the image03 is divided into two regions because of the different color elements. Also, in image04, two persons are merged into one region because of the closeness of the color, texture and position of each person.

Generally, it is very hard to extract the object structure of an image to completely match the structure assigned to the image based on semantic meaning. Some situations where this occurs are as follows.

(a) Many small objects are located close together in a small area, such as the query discussed above in connection with FIG. 2.

(b) The boundary of the object is unclear because the visual characteristics of the object and background are similar. The thin clouds of the sky, shown in FIG. 5, is an example.

(c) The objects, which are visually similar to each other, are in close proximity. Image04 in FIG. 5 is an example of this situation.

Figure 6:
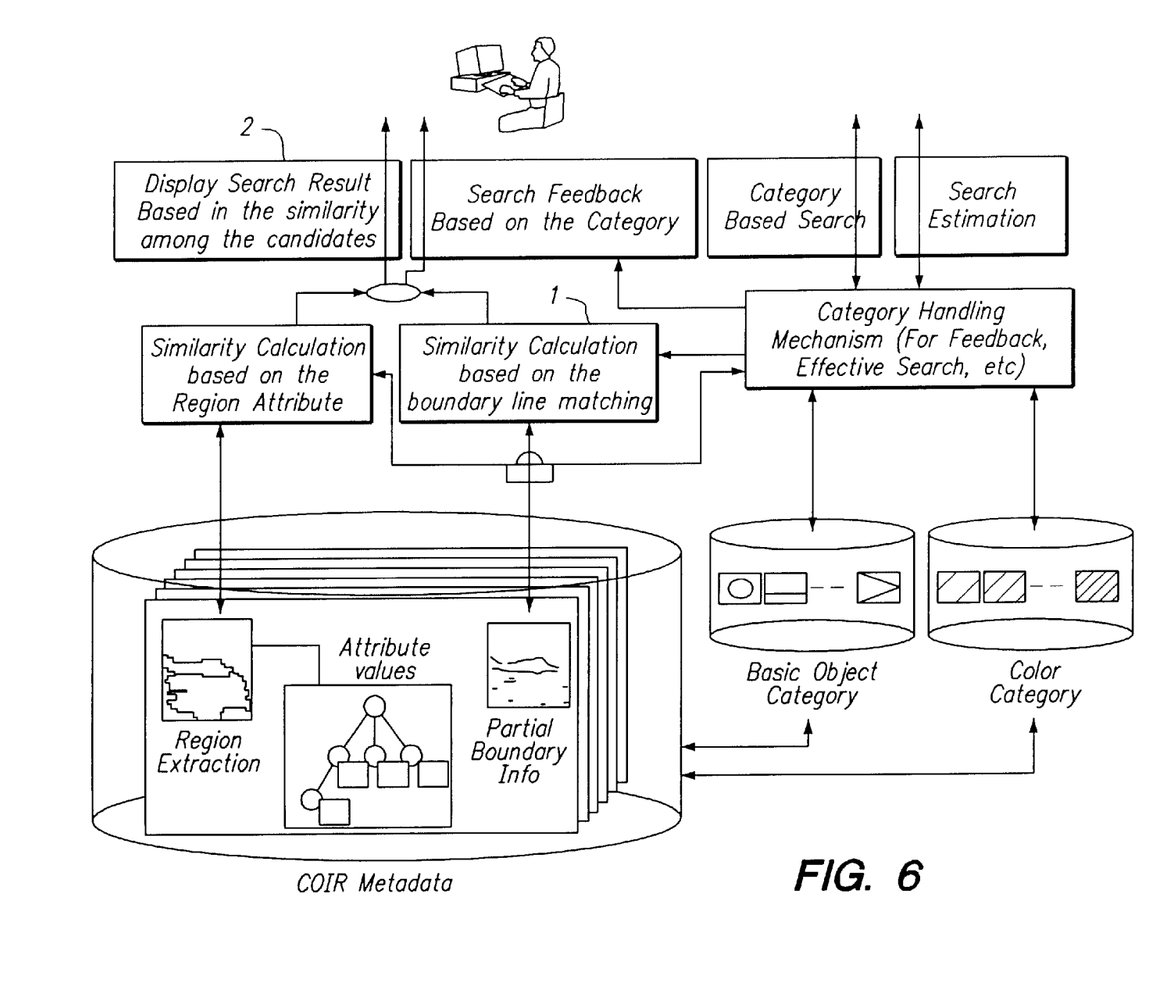
FIG. 6 shows the extended functions of the COIR engine.

All attribute values are stored based on extracted objects. Gaps between the object extraction by the COIR engine and that from the semantic meaning can cause matching deviations. The present invention provides extended functions for the COIR engine and for other search engines to ameliorate the deficiencies in this region-based searching method. FIG. 6 shows the extended functions.

Figure 7:
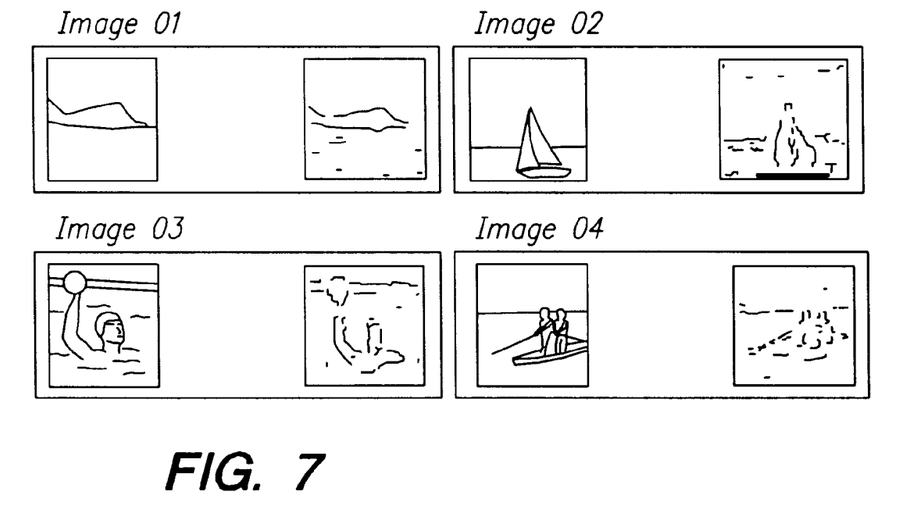
FIG. 7 shows extraction of boundary lines of images.

One of the extended functions is a similarity calculation based on the boundary based, or edge based, image matching. See FIG. 6(1). This step calculates the compositional similarity based on the boundary lines. In the registration phase, where images are registered, the COIR engine extracts the boundary lines from the images, as shown in FIG. 7. These lines are used to extract objects from the image with other visual characteristics. The COIR engine stores these lines in the metadata and uses them to calculate similarity based on composition. A correlation of the boundary lines is computed both in local scope and global scope.

In accordance with the present invention, the calculation based on boundary line matching is applied to the search results of an initial search based upon region attributes. Such region based searching is known to those in this field and need not be discussed further. The boundary based matching step compares line segments directly and evaluates similarity even when the lines are only partially extracted. The boundary based matching of the present invention is designed to be flexible about object shifting and also supports global-level similarities.

Another extended function, provided in accordance with the present invention, is to display search results based on similarity among the result candidates. See FIG. 6(2).

In the past, the COIR engine has output the retrieval results in a one-dimensional way, based on similarity values between the results and the query. Most image retrieval systems operate in this manner. However, this sometimes confuses users. It is desirable to have multiple methods of outputting the retrieval results.

Figure 8:
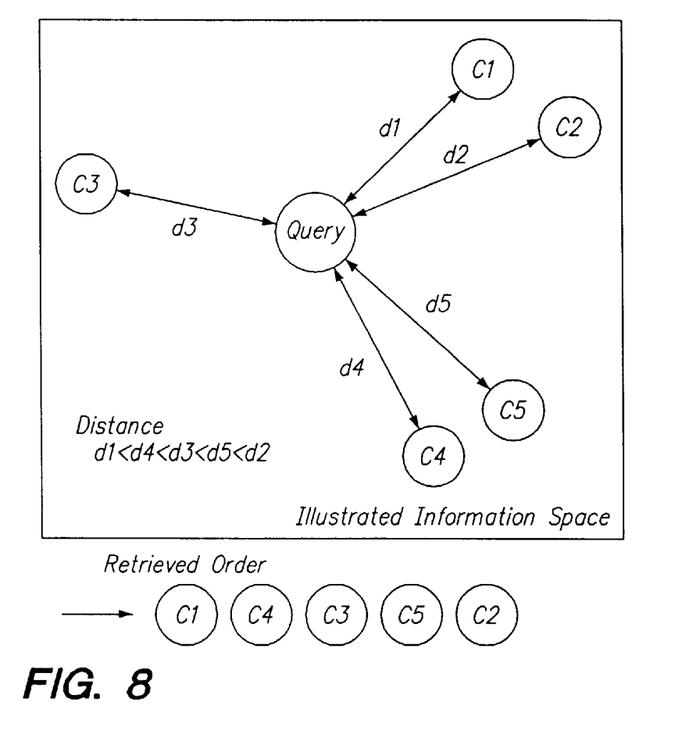
FIG. 8 shows the ordering of result candidates based upon the distance among the search query and the candidates.
Figure 9:
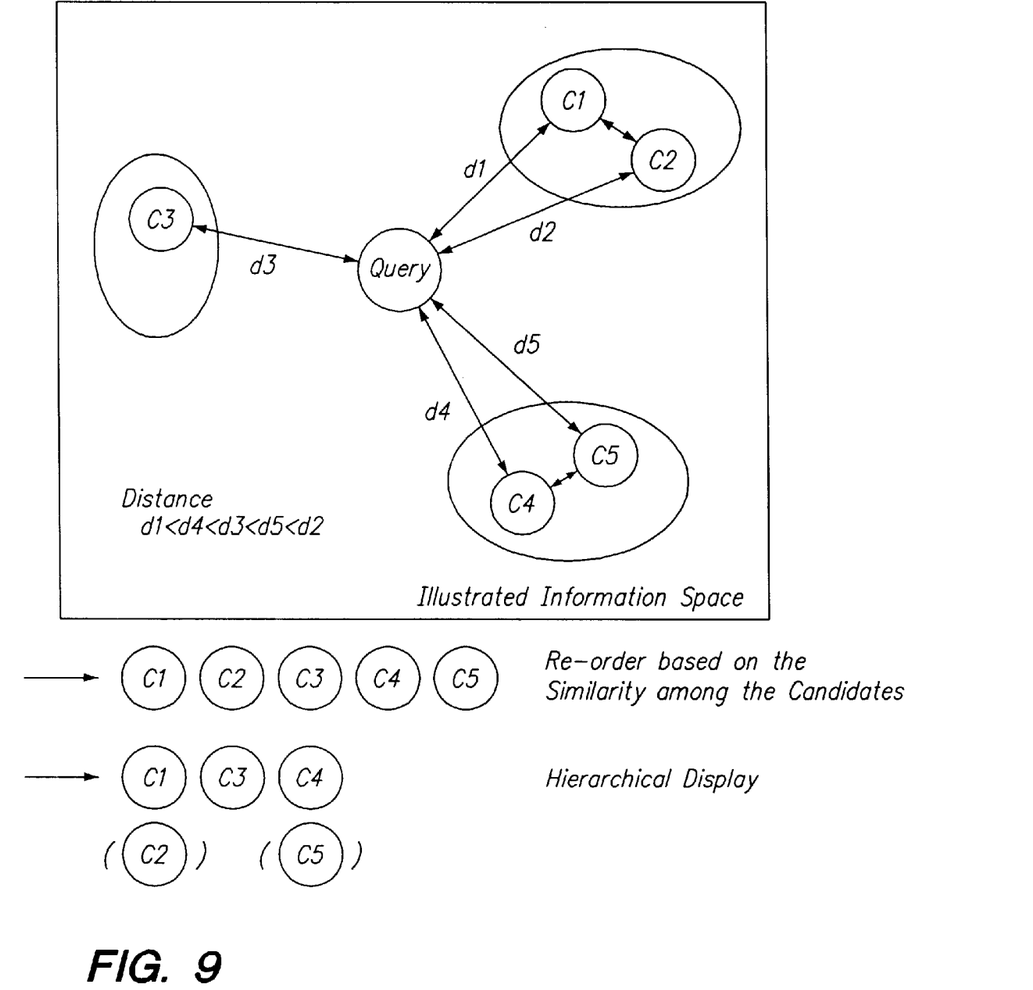
FIG. 9 shows the ordering of result candidates based upon similarities among the candidates.

The lower portion of FIG. 8 illustrates one of the problems caused by the one-dimensional display, resulting from the fact that there are many ways to measure the similarities, such as color, composition, the location of the main object, etc. The lower portion of FIG. 8 shows the images retrieved in order based upon the distance, dn, between the query and the result candidates, C1, C4, C3, C5 and C2, where d1<d4<d3<d5<d2. However, this order of retrieval does not take into account the similarities between the result candidates themselves. In the upper portion of FIG. 8, in accordance with the present invention, similarity among result candidates is shown in a two-dimensional way. In FIG. 8, result candidates C1 and C2 are close to each other, while result candidate C4 is similar to result candidate C5. However, under the order based on the similarity between query and result candidates, measured according to distance dn, C3, C4, C5 are located between C1 and C2. To help the user understand the retrieval results, the present invention forms groups based on the similarities among the candidates, as illustrated in FIG. 9, rather than based strictly on the similarity between the candidates and query. Looking at FIG. 9, because C1 and C2 are close to each other, C1 and C2 are grouped together. Additionally, because C4 and C5 are close to each other, C4 and C5 are grouped together. C3, being by itself, is grouped accordingly.

Figure 10A:
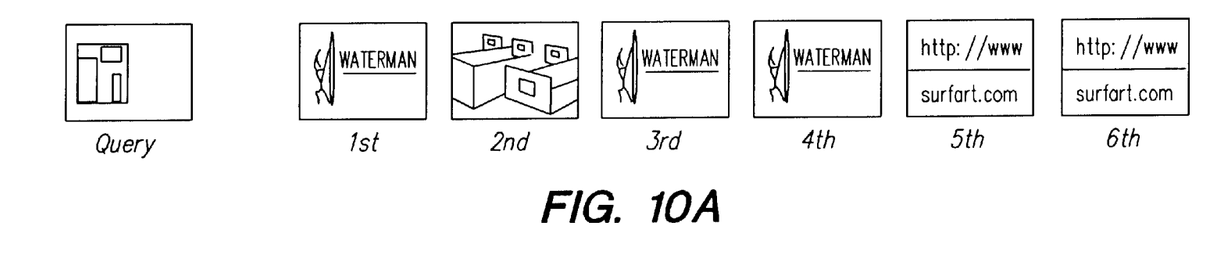
FIG. 10 shows the result images and shows the result images grouped by similarities between the result images.
Figure 10B:
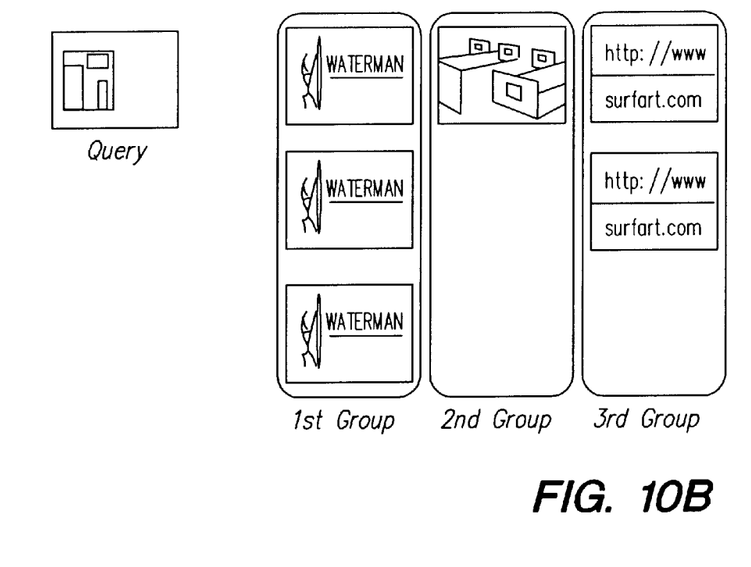

The images in FIG. 10(a) show the result images in an order based on the similarity between the query and the result candidates. While the first and third and fourth candidates are similar to each other, the second candidate is retrieved between the first and third because of the value of dn. FIG. 10(b) shows an example of the result display based on the similarity grouping in accordance with the present invention. In accordance with the second extended function of the present invention, similarities among the candidates are calculated to form groups and the order in which the search results are presented is changed based on the grouping.

Users can specify threshold values to determine how the images are categorized into groups. This categorization is also helpful to visualize the retrieval results by allowing the users to understand the retrieval result intuitively. In addition, this categorization is used to reduce the number of images, which have to be displayed at one time. This is done by grouping the candidates and selecting representative images from each group. This also helps users to understand the results at a glance.

Figure 11:
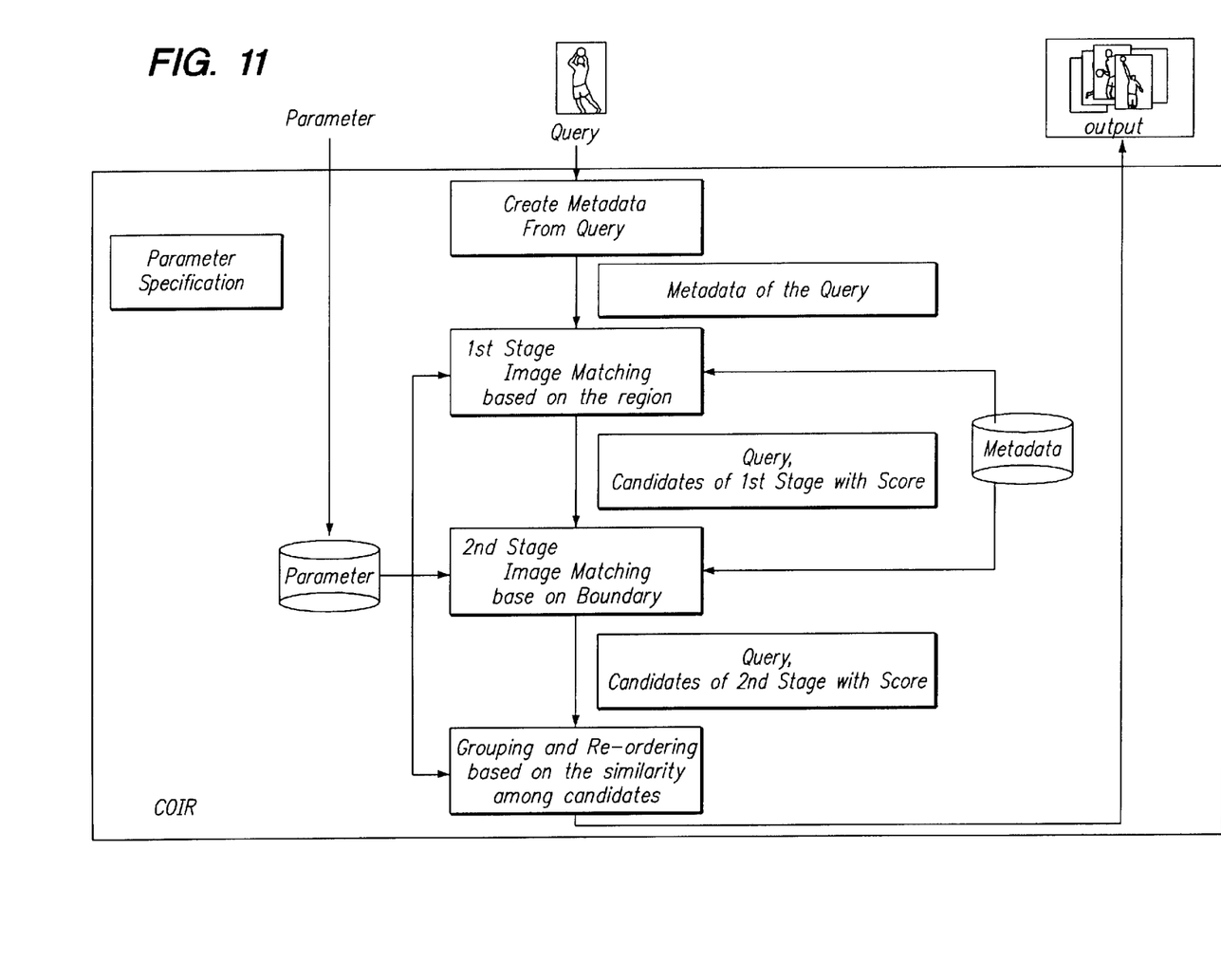
FIG. 11 shows a matching procedure in accordance with an embodiment of the present invention.

The extended search engine functions just discussed will now be discussed in greater detail. In accordance with the present invention, a matching procedure has three major steps, as shown in FIG. 11.

(1) Image matching based on region;
(2) Image matching based on boundary;
(3) Grouping and re-ordering based on similarity among result candidates.

Step (1), image matching based on region, involves calculating similarity based primarily on the following three criteria.

(a) Shape Similarity of a region;
(b) Color Similarity of a region;
(c) Compositional Similarity.

Compositional similarity and shape similarity represent the structural similarity of the image. These structural similarity values, calculated in step (1), are modified in step (2). Similarity values based on color similarity of regions are utilized without any changes in step (2) to determine similarity between images. Since it takes more time to execute step (2) and step (3) compared with step (1), step (1) is first applied to the database of images to reduce the number of the images to be processed in step (2) and step (3). Once step (1) is completed, step (2) is applied to results of step (1) and step (3) is applied to the results of step (2). The number of results to be processed in step (2) and step (3) can be controlled by the user. Step (1) is described in detail in Hirata et al, "Media-based Navigation for Hypermedia Systems." A detailed discussion of boundary based image matching and grouping and reordering based on similarity will now be presented.

Figure 12:
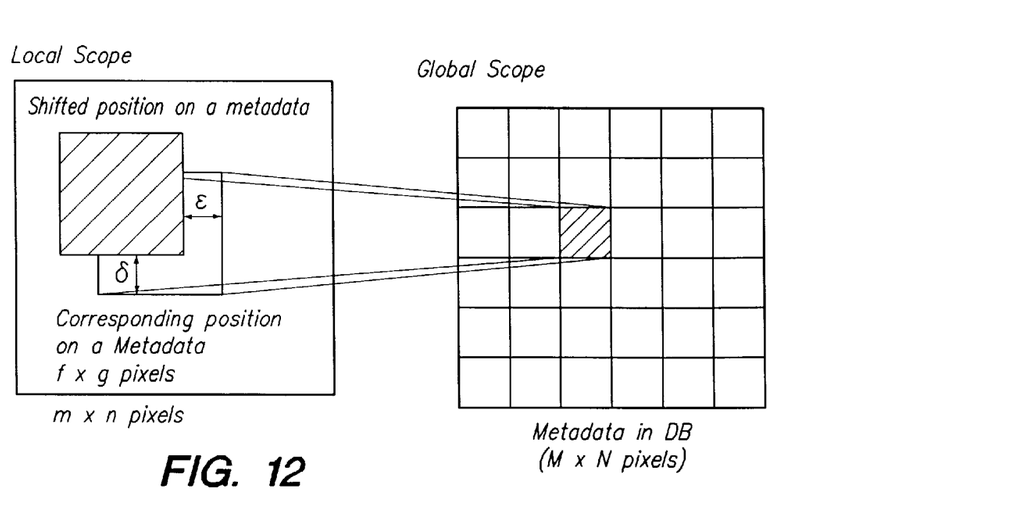
FIG. 12 shows a boundary based image matching procedure in accordance with an embodiment of the present invention.

FIG. 12 illustrates the boundary based image matching process (step (2)) in accordance with the present invention. In this process, the system divides the metadata of the query image into local blocks. Each local block, of size f*g, is shifted in two-dimensions near the same position of the metadata of a candidate image in the database to find the best match position. In FIG. 12, the local block is shifted in the m*n pixel area. Even if the object in the metadata includes some noise and additional lines, or the size of the object is different, these errors may not affect any other local blocks because of this small matching size. Because of this two dimensional shifting, the system matches objects located in slightly different positions.

When there are no boundary lines on the specific pixels in the query images, there are two possible interpretations. The first interpretation is that "there are no boundary lines on the specific pixels." The second interpretation is that "users do not care about the values on the specific pixels." Users can specify one of the two interpretations as a criterion for retrieval.

The following algorithm evaluates similarity using each line element as a unit. It is possible to evaluate the similarity even when the boundary lines are only partially detected.

[Algorithm]:

(A) Divide a target metadata into local blocks

Target metadata $U_t=\{u_{ij}\}$ and a query metadata $V=\{v_{ij}\}$ are divided into several blocks, where i and j define the local block number. In this particular example, the metadata size for the boundary data is M×N=48*48. Additionally, in this particular example, the COIR engine divides this matrix into 6*6 blocks and each local block size is f×g=8*8 pixels.

(B) Calculate the local correlation

Calculate the correlation $^{ab}C_{\delta\epsilon}$, between the local blocks, $^{ab}U$ and $^{ab}V$ with shifting $^{ab}V$ by $\delta, \epsilon$ $$^{ab}C_{\delta\varepsilon} = \sum_{r=fa}^{r=f(a+1)-1} \sum_{s=gb}^{s=g(b+1)-1} (\alpha u_{rs} \cdot v_{r+\delta,s+\varepsilon} + \beta \overline{u_{rs}} \cdot \overline{v_{r+\delta,s+\varepsilon}} + \gamma u_{rs} \oplus v_{r+\delta,s+\varepsilon})$$

where a and b define the position of the local block within a particular metadata, and m and n define the area in which the local block may be shifted (See FIG. 12).

Here, coefficients $\alpha, \beta, \gamma$ are control parameters used to estimate matching and mismatching patterns. The values of these parameters have to be controlled based on the query. They are calculated based on the ratio between boundary and non-boundary pixel numbers. In this particular example, local blocks are shifted by a maximum of 4 pixels, e.g. set $\delta$ and $\epsilon$ between −4 and 4. This means that at most an 8.3% shifted error for all directions is considered in this matching. When white pixels have to be regarded as "don't care," $\alpha=1$, $\beta=0$ and $\gamma=0$. Since the ratio of the boundary is roughly controlled based on the local and global threshold values, the difference caused from the number of the boundary among images is not of concern. The local correlation between these two blocks is defined as follows.

$$^{ab}C = \max(^{ab}C_{\delta\epsilon})$$

(for $-f/2<=\delta<=f/2$, $-g/2<=\epsilon<=g/2$, in the present example.)

(C) Global correlation

Calculate the global correlation $C_t$ between the target metadata $U_t$ and the metadata V as a sum of the local correlation values:

$$C_t = \sum_a \sum_b {}^{ab}w \cdot {}^{ab}C$$

where, $^{ab}w$ is a weighting parameter which depends upon the position of local block $^{ab}U$.

(D) Normalize and integrate other factors

Apply steps A to C to every selected target image and calculate the average and standard deviation. All the scores are normalized based on the average and standard deviation. This value is introduced into the shape-composition similarity calculated in region-based analysis.

Now the step of grouping and reordering based upon the similarity among the candidates (step (3)) will be discussed. In this step, the COIR engine calculates the similarities and categorizes the results based on the similarities. The algorithm for executing this step is as follows.

[Algorithm]:

(A) Calculate the similarities using all the candidate metadata as queries

To calculate the similarities, integrated scores from region based matching criteria and boundary line-based criteria are used. Similarities of all the combinations are calculated and stored in a matrix form.

(B) Calculate the mutual similarities

From the matrix, obtained in (1), the mutual similarities between candidates is extracted. When the similarity of B from A is $S_{AB}$ and the similarity of A from B is $S_{BA}$, the mutual similarity between A and B is calculated as $(S_{AB}+S_{BA})/2$. The similarity is normalized based on the distribution of the raw similarities. The mutual similarity is evaluated by taking the average.

(C) Sort and categorize the results

Based on the mutual similarities between images, retrieval results are sorted. According to the users' specification, the grouping and order of the output of the result candidates is decided. As illustrated above in FIG. 7, the images which are similar to each other are assumed to be under one group and are re-ordered based on the similarity. Users can specify the forms of the output.

Thus, in accordance with the present invention, a new image search mechanism has been presented. The present invention efficiently integrates region based analysis with boundary analysis in matching steps in order to utilize the structural similarity. Additionally, a specific algorithm for boundary analysis is presented. Further, methods of classifying the results to enable to user to better visualize the results have also been presented.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for querying a database of images comprising the steps of:
   (a) calculating a first similarity between a query image and the images using region-based image matching to produce a first set of similar images; and
   (b) calculating a second similarity between the query image and the first set of similar images using boundary based image matching to produce a second set of similar images.

2. The method according to claim 1, further comprising the step of:
   (c) grouping the second set of similar images into clusters based upon a similarity calculation among members of the second set of similar images.

3. The method according to claim 1, further comprising the step of:
   (c) re-ordering the second set of similar images based upon a similarity calculation among members of the second set of similar images.

4. The method according to claim 1, wherein said step (a) comprises the following steps:
   (a)(I) calculating a shape similarity for each region of each of the images;
   (a)(II) calculating a color similarity for each region of each of the images; and
   (a)(III) calculating a compositional similarity for each region of each of the images.

5. The method according to claim 4, wherein the step of calculating similarity between a query and the first set of similar images using boundary based image matching modifies the results of said steps (a)(I) and (a)(III).

6. The method according to claim 1, wherein a maximum allowable number of members of the first set of images is specified.

7. The method according to claim 1, wherein said step (b) comprises, for each member of the first set of similar images, the steps of:
   (b)(I) dividing the query image into local blocks $V=\{v_{ij}\}$, where i and j identify the local blocks V;
   (b)(II) dividing the member into local blocks $U_t=\{u_{ij}\}$, where i and j identify the local blocks $U_t$;
   (b)(III) calculating a local correlation between the local blocks $^{ab}U$ and $^{ab}V$, said local correlation being calculated based upon boundary based matching within the local blocks, said local blocks, $^{ab}U$ and $^{ab}V$, being shifted relative to each other; and
   (b)(IV) calculating a global correlation between $U_t$ and V as a weighted summation of the local correlation.

8. The method according to claim 7, wherein the local correlation depends upon the number of boundary pixels in the query image matching boundary pixels in the member, the number of non-boundary pixels in the query image matching non-boundary pixels in the member and the number of boundary pixels in one of the query image and the member matching non-boundary pixels in the other of the query image and the member.

9. The method according to claim 7, wherein the local correlation is calculated between the local blocks $^{ab}U$ and $^{ab}V$, shifting $^{ab}V$ by $\epsilon, \delta$ pixels, where a and b define a position of the local blocks V and $U_t$ in the query image and the member, respectively and each of the local blocks $U_t$ and V has a size f×g pixels, in accordance with the formula:

$$^{ab}C_{\delta\varepsilon} = \sum_{r=fa}^{r=f(a+1)-1} \sum_{s=gb}^{s=g(b+1)-1} (\alpha u_{rs} \cdot v_{r+\delta,s+\varepsilon} + \beta \overline{u_{rs}} \cdot \overline{v_{r+\delta,s+\varepsilon}} + \gamma u_{rs} \oplus v_{r+\delta,s+\varepsilon})$$

where r and s define the area of shifting $^{ab}V$ and $\alpha, \beta, \gamma$ are control parameters for estimating matching and mismatching.

10. The method according to claim 9, wherein said step (b)(III) further includes the step of calculating the local correlation between the local blocks, $U_t$ and V, in accordance with the formula:

$$^{ab}C = \max(^{ab}C_{\delta\epsilon}).$$

11. The method according to claim 7, wherein the global correlation between $U_t$ and V is calculated in accordance with the formula, where $^{ab}w$ is a weighting parameter which depends upon the position of local block $^{ab}U$:

$$C_t = \sum_a \sum_b {}^{ab}w \cdot {}^{ab}C.$$

12. The method according to claim 11, further comprising the step of calculating an average and standard deviation of the global correlation for each member of the first set of similar images to provide a score for each member of the first set of similar images.

13. The method according to claim 2, wherein said step (c) comprises the steps of:
   (c)(I) calculating a similarity value for each pair of members of the second set of images, thereby forming a matrix of similarity values for the pairs of members of the second set of images;

(c)(II) calculating a mutual similarity S between each of the pairs of images;

(c)(III) normalizing the calculated mutual similarity S for each of the pairs of images; and (c)(IV) grouping the images based upon the normalized mutual similarity of all of the pairs of images.

14. The method according to claim 13, wherein the mutual similarity is calculated in accordance with the formula $S=(S_{AB}+S_{BA})/2$, where $S_{AB}$ is the similarity value of a second image B of the pair of images to a first image A of the pair of images and where $S_{BA}$ is the similarity value of the first image A to the second image B.

15. The method according to claim 2, further comprising the step of displaying the second set of images grouped into the clusters.

16. The method according to claim 3, further comprising the step of displaying the re-ordered second set of images.

17. The method according to claim 2, further comprising the steps of:

(d) selecting a representative image from each of the clusters; and (e) displaying for each cluster the selected representative image.

18. The method according to claim 1, wherein the database of images is a multimedia database.

19. The method according to claim 1, wherein the database of images is on the World Wide Web (WWW).

20. A method for querying a database of images comprising the steps of:

(a) calculating a similarity between a query image and the images using image matching to produce a set of similar images; and (b) grouping the set of similar images into clusters based upon a similarity calculation among members of the set of similar images.

21. The method according to claim 20, wherein said step (b) comprises the steps of:

(b)(I) calculating a similarity value for each pair of members of the set of images, thereby forming a matrix of similarity values for the pairs of members of the set of images;

(b)(II) calculating a mutual similarity S between each of the pairs of images;

(b)(III) normalizing the calculated mutual similarity S for each of the pairs of images; and (b)(IV) grouping the images based upon the normalized mutual similarity of all of the pairs of images.

22. The method according to claim 21, wherein the mutual similarity S is calculated in accordance with the formula $S=(S_{AB}+S_{BA})/2$, where $S_{AB}$ is the similarity value of a second image B of the pair of images to a first image A of the pair of images and where $S_{BA}$ is the similarity value of the first image A to the second image B.

23. A system for querying a database of images comprising:

(a) a workstation, including a display; and (b) an application program for (i) calculating a first similarity between a query image and the images using region-based image matching to produce a first set of similar images; and (ii) calculating a second similarity is calculated between the query image and the first set of similar images using boundary based image matching to produce a second set of similar images.

24. The system according to claim 23, wherein, in the application program, the second set of similar images is grouped into clusters based upon a similarity calculation among members of the second set of similar images.

25. The system according to claim 23, wherein, in the application program, the second set of similar images is re-ordered based upon a similarity calculation among members of the second set of similar images.

26. The system according to claim 23, wherein, in the application program, the calculation of similarity between the query and the images using region-based image matching is accomplished by:

(i)(I) calculating a shape similarity for each region of each of the images;

(i)(II) calculating a color similarity for each region of each of the images; and (i)(III) calculating a compositional similarity for each region of each of the images.

27. The system according to claim 26, wherein, in the application program, the calculation of the second similarity modifies the results of (i)(I) and (i)(III).

28. The system according to claim 23, wherein a maximum allowable number of members of the first set of images is specified.

29. The system according to claim 23, wherein, in the application program, the calculation of the second similarity between the query image and the first set of similar images using boundary based image matching, for each member of the first set of similar images, is accomplished by:

(b)(I) dividing the query image into local blocks $V=\{v_{ij}\}$, where i and j identify the local blocks V;

(b)(II) dividing the member into local blocks $U_t=\{u_{ij}\}$, where i and j identify the local blocks $U_t$;

(b)(III) calculating a local correlation between the local blocks $^{ab}U$ and $^{ab}V$, said local correlation being calculated based upon boundary based matching within the local blocks, said local blocks, $^{ab}U$ and $^{ab}V$, being shifted relative to each other; and (b)(IV) calculating a global correlation between $U_t$ and V as a weighted summation of the local correlation.

30. The system according to claim 29, wherein, in the application program, the local correlation depends upon the number of boundary pixels in the query image matching boundary pixels in the member, the number of non-boundary pixels in the query image matching non-boundary pixels in the member and the number of boundary pixels in one of the query image and the member matching non-boundary pixels in the other of the query image and the member.

31. The system according to claim 29, wherein, in the application program, the local correlation is calculated between the local blocks $^{ab}U$ and $^{ab}V$, shifting $^{ab}V$ by $\epsilon,\delta$ pixels, where a and b define a position of the local blocks V and $U_t$ in the query image and the member, respectively and each of the local blocks $U_t$ and V has a size f×g pixels, in accordance with the formula:

$$^{ab}C_{\delta\varepsilon} = \sum_{r=fa}^{r=f(a+1)-1} \sum_{s=gb}^{s=g(b+1)-1} (\alpha u_{rs} \cdot v_{r+\delta,s+\varepsilon} + \beta \overline{u_{rs}} \cdot \overline{v_{r+\delta,s+\varepsilon}} + \gamma u_{rs} \oplus v_{r+\delta,s+\varepsilon})$$

where r and s define the area of shifting $^{ab}V$ and α, β, γ are control parameters for estimating matching and mismatching.

32. The system according to claim 31, wherein, in the application program, the calculation of the local correlation includes calculating the local correlation between the local blocks, $U_t$ and V, in accordance with the formula:

$$^{ab}C = \max(^{ab}C_{\delta\varepsilon}).$$

33. The system according to claim 29, wherein, in the application program, the global correlation between $U_t$ and V is calculated in accordance with the formula, where $^{ab}w$ is a weighting parameter which depends upon the position of local block $^{ab}U$:

$$C_t = \sum_a \sum_b {}^{ab}w \cdot {}^{ab}C.$$

34. The system according to claim 33, wherein, in the application program, an average and standard deviation of the global correlation is calculated for each member of the first set of similar images to provide a score for each member of the first set of similar images.

35. The system according to claim 24, wherein, in the application program, the grouping of the second set of images into clusters is accomplished by:

(iii)(I) calculating a similarity value for each pair of members of the second set of images, thereby forming a matrix of similarity values for the pairs of members of the second set of images;

(iii)(II) calculating a mutual similarity S between each of the pairs of images;

(iii)(III) normalizing the calculated mutual similarity S for each of the pairs of images; and (iii)(IV) grouping the images based upon the normalized mutual similarity of all of the pairs of images.

36. The system according to claim 35, wherein the mutual similarity S is calculated in accordance with the formula $S=(S_{AB}+S_{BA})/2$, where $S_{AB}$ is the similarity value of a second image B of the pair of images from a first image A of the pair of images and where $S_{BA}$ is the similarity value of the first image A from the second image B.

37. The system according to claim 24, wherein the second set of images grouped by the clusters is displayed on the display.

38. The system according to claim 25, wherein the re-ordered second set of images is displayed on the display.

39. The system according to claim 24, wherein, in the application program, a representative image from each of the clusters is selected; whereupon, for each cluster, the selected representative image is displayed on the display.

40. The system according to claim 23, wherein the database of images is a multimedia database.

41. The system according to claim 23, wherein the database of images is on the World Wide Web (WWW).

42. A system for querying a database of images comprising:

(a) a workstation, including a display; and (b) an application program for (i) calculating a similarity between a query image and the images using image matching to produce a set of similar images; and (ii) grouping the set of similar images into clusters based upon a similarity calculation among members of the set of similar images.

43. The system according to claim 42, wherein, in the application program, the grouping of the set of similar images into clusters is accomplished by:

(iii)(I) calculating a similarity value for each pair of members of the set of images, thereby forming a matrix of similarity values for the pairs of members of the set of images;

(iii)(II) calculating a mutual similarity S between each of the pairs of images;

(iii)(III) normalizing the calculated mutual similarity S for each of the pairs of images; and (iii)(IV) grouping the images based upon the normalized mutual similarity of all of the pairs of images.

44. The system according to claim 43, wherein the mutual similarity S is calculated in accordance with the formula $S=(S_{AB}+S_{BA})/2$, where $S_{AB}$ is the similarity value of a second image B of the pair of images from a first image A of the pair of images and where $S_{BA}$ is the similarity value of the first image A from the second image B.

* * * * *